E. M. GREENWAY, Jr.,

Assignor to E. N. DICKERSON.

Air-Filters.

No. 8,596. Reissued Feb. 25, 1879.

Witnesses:

Geo. W. Miatt

Chas K. Clark

Inventor:

E. M. Greenway Jr

By his attorney

E N Dickerson Jr

UNITED STATES PATENT OFFICE.

EDWARD M. GREENWAY, JR., OF BALTIMORE, MARYLAND, ASSIGNOR TO E. N. DICKERSON, OF NEW YORK CITY.

IMPROVEMENT IN AIR-FILTERS.

Specification forming part of Letters Patent No. 128,301, dated June 25, 1872; Reissue No. 8,596, dated February 25, 1879; application filed December 2, 1878.

*To all whom it may concern:*

Be it known that I, EDWARD M. GREENWAY, Jr., of the city of Baltimore, county of Baltimore, State of Maryland, have invented a new and useful Improvement in Air-Filters, of which the following is a full, true, and exact description, reference being had to the accompanying drawings.

It has been discovered that fibrous material, especially in the form of loose cotton-fiber, possesses the quality of filtering from the air which passes through it all dust, germs of disease, spores, organic cells, and other particles in it suspended, which spores are highly injurious to life, and are very provocative of decay; in fact all decay and fermentation is initiated by the presence of such germs.

My invention relates to a diaphragm of this material interposed in an air-current, for the purpose of rendering the air which is passed through such filter perfectly pure and clean.

Figure 1:
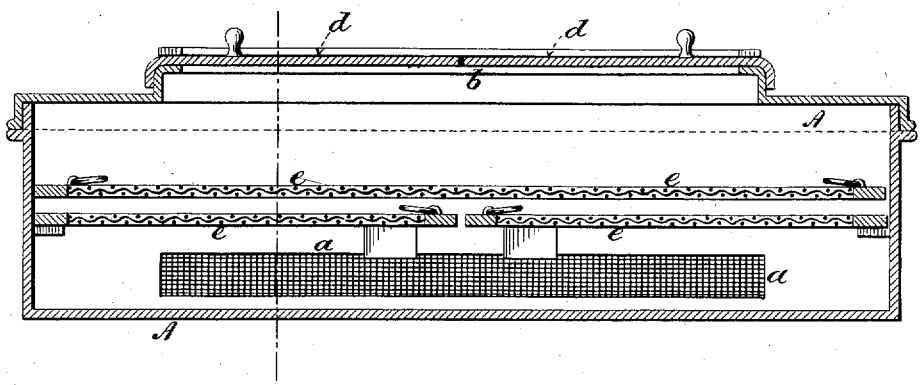
Figure 2:
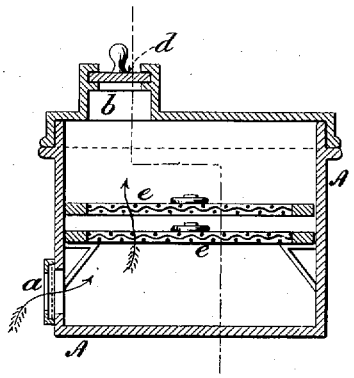

In my drawings, Figure 1 represents a longitudinal cross-section, showing the method of supporting the filter. Fig. 2 represents a vertical cross-section of the same at right angles with Fig. 1.

A represents a casing or box, made of suitable length and width, provided with an opening or passage above and below the diaphragm supported in it, allowing the passage of air through such diaphragm. The lower opening is here represented at *a*, and is covered with a fine-wire sieve, for the purpose of filtering from the air large particles before they reach the fibrous filtering-diaphragm.

Within the casing A, suitably supported, is a perforated plate or wire sieve, E, arranged to support a diaphragm of fibrous material or cotton-fiber. The lower diaphragm is represented as supported upon brackets, but may be arranged in any suitable way. Both the diaphragms are removable by handles, as shown.

Above the filtering-diaphragm is placed another sieve or perforated plate, *e*. At the top of the chamber may be placed a slot or valve, *d*, in the air-opening, for the purpose of regulating the quantity of air passing through it.

I do not confine myself to a filter arranged between perforated plates, for the entire box may be filled with such fiber, more or less, the same serving as a filter for the air passing through it.

The fibrous material, preferably cotton-fiber, which is shown, is especially useful for the purpose described, from the fact that its fibers or threads are covered with fine filaments, which fill the interspaces between the principal fibers, and thereby form a practically perfect sieve for freeing the air from the dust and spores which it carries and supports.

In this respect my filter is distinguished from a filter of sponge, or similar material, which is not provided with these interstitial fibers, which are the principal point in my invention.

I am aware, also, that it is not new to use cotton-fiber as a filter, and that broken masses or bundles of this fiber have been previously used—as, for instance, in the English patent to William Clay for ventilating railway-carriages, 1,648 of 1865. In that patent there is a box filled with a body of cotton in loose separate masses. The use of the filter in this shape prevents almost entirely the passage of the air through it, because large masses of resisting fiber are presented to the passage of the air, and the fiber is not continuous, being broken up into masses, and allowing interspaces, through which the air can pass without being filtered. Therefore the filter arranged as shown in said patent would be entirely ineffective unless an air-forcing apparatus is combined with it, and even then would only partially filter the air, because of the large open interspaces between the bundles of fiber.

It is also exceedingly important that an air-filter should be of even thickness throughout, so that the air shall not pass through one portion of such filter in preference to another, which would speedily choke up and render useless such portion.

I have, therefore, confined my filtering diaphragm between two adjacent parallel plates, thereby obtaining a filter of even thickness and homogeneous substance, thereby insuring ready passage of the air through it, and at the same time insuring a thorough filtering of every portion of the air passing through.

I am aware of the patent to J. Lesperance for car-ventilators, February 9, 1869, No. 86,769, and do not claim anything there shown.

What I claim as my invention, and desire to secure by Letters Patent, is—

1. In combination with a passage through which air is moving, a diaphragm of fibrous material, supported by means of a perforated plate or sieve, substantially as described.

2. In combination with a passage through which air is moving, a filter of fibrous material, for the purpose of fitering the air passing through such passage, and a wire sieve, for the purpose of freeing the air of the larger particles before it comes in contact with the fibrous filter, substantially as described.

3. In combination with a passage through which air is moving, a diaphragm of fibrous material, supported by means of a perforated plate or sieve, and a wire sieve, for the purpose of freeing the air of the larger particles before it comes in contact with the fibrous filter, substantially as described.

4. In combination with a passage through which air is moving, a filter of fibrous material, for the purpose of filtering the air, and a rigid adjustable valve, for regulating the passage of the air, substantially as described.

5. In combination with a passage through which air is moving, a diaphragm of fibrous material, supported by means of a perforated plate or sieve, and a valve for regulating the passage of the air, substantially as described.

6. In combination with a passage through which air is moving, a filter of fibrous material, for the purpose of filtering the air passing through such passage, and a wire sieve, for the purpose of freeing the air of the larger particles before it comes in contact with the fibrous filter, and a valve for regulating the passage of the air, substantially as described.

7. In combination with a passage through which air is moving, a diaphragm of fibrous material, supported by means of a perforated plate or sieve, and a wire sieve, for the purpose of freeing the air of the larger particles before it comes in contact with the fibrous filter, and a valve for regulating the passage of the air, substantially as described.

8. In an air-passage through which air is moving, a filter of fibrous material, in combination with a removable plate or sieve, substantially as described.

9. In combination with a passage through which air is moving, a thin diaphragm or filter of fibrous material, having parallel surfaces and homogeneous continuous structure throughout, for the purpose of allowing the free passage of the air through each and every part of it, and at the same time sifting or separating from such air all the particles carried in suspension by it, substantially as and for the purposes described.

EDWARD M. GREENWAY, JR.

Witnesses:

M. J. CHENOWETH,

WM. D. ELDRIDGE, JR.